United States Patent Office 3,455,890
Patented July 15, 1969

---

3,455,890
CATALYST FOR OLEFIN POLYMERIZATION
Edmund B. Davidson, Elizabeth, N.J., assignor to Esso Research and Engineering Company, a corporation of Delaware
No Drawing. Filed Nov. 18, 1964, Ser. No. 412,247
Int. Cl. C08f 1/34
U.S. Cl. 260—85.3                                                      15 Claims This invention relates to an improved method for polymerizing cationically initiable monomer and further relates to a modified Friedel-Crafts type catalyst. In particular, this invention relates to a method for increasing the molecular weight of polymers formed from said monomers. More particularly, this invention relates to the polymerization of cationically initiable monomers with a modified Friedel-Crafts type catalyst comprising the uncomplexed liquid phase of the admixture of an aluminum halide or organoaluminum halide catalyst, or solution thereof, and a halide of a cationic material selected from the group consisting of lithium, sodium, potassium and ammonium.

The low temperature polymerization or copolymerization of alpha-monoolefins with Friedel-Crafts type catalysts is well known. See, for example, U.S. Patents 2,356,128 and 2,387,543, inter alia. The catalyst most frequently used for the aforementioned type of polymerization is aluminum chloride. It has further been proposed to polymerize alpha-monoolefins by means of a catalyst represented by the formula $R_nAlX_m$, wherein R is a monovalent alkyl hydrocarbon radical, X is halogen, and $m$ and $n$ are integers of from 1 to 2 inclusive and $m$ plus $n$ equals 3. See, for example, U.S. Patents 2,220,930 and 2,387,517. It has also previously been suggested that a complex of an organoaluminum halide with an inorganic halide is a suitable catalyst to initiate polymerization of hydrocarbons of the olefin series. See U.S. Patent 2,220,930. It has, however, since been found that organoaluminum halide-inorganic halide complexes are substantially inoperable as catalysts for the low temperature polymerization of alpha-monoolefins.

It is therefore an object of the present invention to provide a new and improved method for effecting the polymerization of cationically initiable monomers. Another object of the present invention is to provide a method for increasing the molecular weight of polymers formed from said monomers. A further object of the present invention is to provide the art with novel modified aluminum halide and organoaluminum halide catalysts. Other objects, as well as advantages of the present invention, will become clear from the following description and examples.

It has now been found that an improved cationic catalyst can be prepared by contacting an organoaluminum halide or an aluminum halide solution with a halide of a metal or its equivalent, selected from the group consisting of lithium, sodium, potassium and ammonium, at a temperature of between about 0° C. and about 100° C. and recovering, as the modified catalyst, the liquid phase of the admixture at a temperature of between about 0° C. and about 50° C., preferably about 20° C. These modified catalysts result in the production of polymers that have a substantially higher molecular weight than the polymer prepared by the unmodified organoaluminum halide catalyst. For example, a cationically initiable alpha-monoolefin, such as isobutylene, is polymerized at a temperature of between about 0° C. and about −120° C. with a modified catalyst prepared under the aforementioned conditions by contacting a compound represented by the empirical formula $R_nAlX_m$, wherein R is a branched or straight chain $C_1$-$C_{12}$ alkyl, X is halogen, $n$ is a cardinal number of from 0 to 2, $m$ is a cardinal number of from 1 to 3, and $n$ plus $m$ equals 3, with a halide of a metal, or its equivalent, selected from the group consisting of lithium, sodium, potassium and ammonium.

The cationically initiable monomers to which the present process is applicable are, in general, those compounds represented by the empirical formula:

$$CH_2\!=\!C(R_1)R_2$$

wherein $R_1$ is selected from the group consisting of hydrogen, $C_1$-$C_3$ alkyl, phenyl and $C_1$-$C_3$ alkoxy and $R_2$ is selected from the group consisting of $C_1$-$C_{10}$ alkyl, halogen substituted $C_1$-$C_{10}$ alkyls, $C_1$-$C_3$ alkoxy and aryl, such as phenyl, naphthyl and anthracyl. More specifically, the aforementioned alpha-monoolefins include $C_4$-$C_{14}$ alpha-monoolefins, such as butene-1, isobutylene, pentene-1, isopentene, 2-methylbutene-1, 3-methylbutene-1, 4-methylpentene-1, decene-1 and dodecene-1; aryl compounds such as for example styrene, vinyl naphthalene, vinyl anthracene; alkyl substituted styrenes such as the methyl styrenes, p-ethyl styrene and α-methylstyrene; halogen substituted styrenes such as p-chlorostyrene, p-bromostyrene, and 2,5-dichlorostyrene; alkoxy substituted styrenes, such as p-methoxy styrene and p-ethoxy styrene; other vinyl compounds such as vinyl ethers, e.g., isopropyl vinyl ether, isobutyl vinyl ether, 2-ethylhexyl vinyl ether, 2-methoxyethyl vinyl ether; and ketene acetals such as those represented by the empirical formula $CH_2\!=\!C\!-\!(OR_3)_2$, wherein $R_3$ is a $C_1$-$C_3$ alkyl, e.g., 1,1-diethoxy ethylene and 1,1-dimethoxy ethylene. The term "monomer" as used in the specification and claims means the alpha-monoolefins and other cationically polymerizable monomers which are described by the aforementioned empirical formula.

The monomers and substituted alpha-monoolefins of the type hereabove described can, in addition, be copolymerized according to the present novel method with a variety of other unsaturated materials. Such additional materials include diolefins as, for example, $C_4$-$C_{14}$ diolefins, cyclodiolefins, such as $C_5$-$C_6$ cycloalkyl dienes, as well as other unsaturated hydrocarbons, both straight chain and cyclic. Examples of such suitable materials include: butadiene, isoprene, 2,3-dimethyl-1,3-butadiene, myrcene, 6,6-dimethylfulvene, piperylene, cyclopentadiene, cyclohexadiene, β-pinene, divinylbenzene, etc. In preparing a copolymer of an alpha-monoolefin, according to the present method, the alpha-monoolefin should advantageously be present as a major proportion, i.e., 70 to 99.9 wt. percent of the olefin feed. Preferably, the alpha-monoolefin should be present in an amount of between about 85 and about 99.5 wt. percent based on the total monomer feed.

The aluminum halide and organoaluminum halide catalysts utilized in the present novel method can be represented by the empirical formula, $R_nAlX_m$, where R is a branched or straight chain alkyl group having from 1 to 12 carbon atoms, X is halogen, $n$ is a cardinal number of from 0 to 2, $m$ is a cardinal number of 1 to 3, and $n$ plus $m$ equals 3. Suitable catalyst compounds coming within the scope of this empirical formula include: aluminum chloride, aluminum bromide, diethyl aluminum chloride, dipropyl aluminum chloride, dibutyl aluminum chloride, diisobutyl aluminum chloride, diethyl aluminum bromide, diethyl aluminum iodide, dipentyl aluminum chloride, dodecyl aluminum chloride, diisobutyl aluminum bromide, dioctyl aluminum bromide, ethyl propyl aluminum chloride, propyl butyl aluminum chloride, ethyl propyl aluminum bromide, ethyl aluminum dichloride, butyl aluminum dibromide, nonyl aluminum dichloride, etc. The preferred catalysts are ethyl aluminum dichloride and aluminum chloride.

The metal halides with which the above described catalysts are contacted are the halides of a metal, or its equivalent, selected from the group consisting of lithium, sodium, potassium and ammonium. Suitable examples of these metal halides includes: sodium chloride, potassium chloride, lithium chloride, sodium bromide, ammonium chloride, ammonium bromide, potassium iodide, etc. While the ammonium radical is not a metal in the true sense of the word, it has, in numerous instances, been classified as such by chemists for the reason that it behaves chemically in much the same manner as the alkali metals with which it is often grouped. As used herein and in the appended claims, the ammonium radical is classified as a metal and should be so considered.

In preparing the novel modified catalysts of the present process, the aforementioned aluminum halide and organoaluminum halide catalysts are admixed, preferably at or near atmospheric pressure, with one of the above-recited metal halides at a temperature of between about 0° C. and about 100° C., preferably between about 0° C. and about 50° C., more preferably at ambient or room temperature, i.e., about 20° C. for between about 10 and about 15 minutes. The length of the mixing period is not critical to the preparation of the instant modified catalysts and said time can vary between about a minute or less and about several hours. The mixing step can be performed by any means suitable for bringing the two materials into intimate contact with each other, such as by violently agitating a mixture of the two. In the case of a normally liquid catalyst, such as aluminum ethyl dichloride, the solid metal halide can be directly admixed with the catalyst. However, in the case of a normally solid catalyst, such as aluminum chloride, it is first necessary to dissolve the solid catalyst in a suitable diluent, such as methyl chloride; the solid inorganic metal halide is then admixed with this catalyst solution.

After the catalyst and inorganic metal halide have been thoroughly admixed, the admixture is permitted to cool, if the mixing was performed above 50° C., to a temperature of between about 0° C. and about 50° C., preferably to about room temperature (about 20° C.). The modified catalyst, which comprises the supernatant liquid phase of the admixture, is then separated from the precipitate of solid metal halide and/or any metal halide-organoaluminum halide complex which might have been formed. The modified catalyst is then either further diluted with additional solvent or incorporated total strength into the monomer-diluent admixture.

The modified catalysts of the present process are liquids at temperatures of between about 0° C. and about 50° C. and are soluble in alkyl halide solvents, such as methylene dichloride. In contrast, metal halide-organoaluminum halide complexes are generally solids up to about 50° C. and are essentially insoluble in methylene dichloride. Thus, separation of the instant modified catalysts from the complexed catalysts is easily accomplished by the physical means of decanting the supernatant liquid of the catalyst-inorganic metal halide admixture at a temperature below about 50° C., preferably about room temperature, thereby separating the liquid modified catalyst of the instant process from the solid metal halide and/or metal halide-organoaluminum halide complex.

Although the aluminum halide and organoaluminum halide compounds are described as being catalysts, it is to be understood that the catalysts for the present novel process are these materials as modified by the pretreatment addition of the inorganic metal halides under the conditions heretofore described.

In preparing the modified catalyst of the present novel process a solution of the catalyst to be utilized or in the case of a normally liquid catalyst the catalyst itself diluted or undiluted, is contacted with a halide of a cationic material, i.e., an inorganic metal selected from the group consisting of lithium, sodium, potassium and ammonium, under the conditions of temperature and pressure heretofore described. In general, the mole ratio of inorganic metal halide to catalyst in the contacting step will range between about 0.1:1 and about 10:1 and higher and will preferably range between about 0.5:1 and about 2:1. The amount of inorganic metal halide present in the supernatant liquid recovered after admixing the metal halide with the catalyst or catalyst solution is very small due to its limited solubility in the catalyst liquid medium. The maximum amount of inorganic halide dissolved is governed by the solubility of the individual salt in the particular solvent at the particular admixing temperature, but is generally the amount required to saturate the dissolving medium. A preferred method for preparing the modified catalyst of the present novel process is to admix the catalyst or catalyst solution, under the conditions heretofore described, with enough inorganic metal halide so that a residue of said metal halide remains in the flask.

The amount of modified catalyst employed in the polymerization reaction may vary over a considerable range but, in general, will be in an amount ranging between about 0.1% and about 6.0 wt. percent, preferably between about 1 wt. percent and about 3 wt. percent. of the entire monomer mixture.

Suitable solvents which can be used in the practice of the present process, either as a solvent for the catalyst or as the diluent in which the polymerization reaction is performed, are the conventional alkyl halide solvents which are inert and liquid under the conditions of the presently described process. Suitable examples of alkyl halide solvents include: methyl chloride, methyl bromide, ethyl chloride, propyl chloride, ethylene dichloride, vinyl chloride, ethyl bromide, chloroform, and carbon tetrachloride. In addition, carbon disulfide, its analogs and homologs may be used. Moreover, aliphatic hydrocarbon solvents, mixtures thereof, or mixtures with halogen-containing solvents, that are liquid under the polymerization conditions can be used in the practice of the present process. These include: $C_2$–$C_8$ saturated aliphatic and alicyclic hydrocarbons such as pentane, isopentane, hexane, isooctane, methylcyclohexane, cyclohexane, n-butane, n-heptane, etc. Generally, about 50 to 500 parts of diluent are added per 100 parts of monomer feed. The preferred diluent for the reaction medium is methyl chloride and the preferred solvent for the catalyst is methylene chloride.

In carrying out the polymerization reaction, according to the present process, the monomer or monomers to be polymerized and a suitable diluent are cooled to a temperature ranging between about 0° C. and about —120° C., preferably between about —20° C. and about —90° C. Thereafter, a solution of the modified catalyst, prepared as above, in a portion of the diluent utilized for the monomer feed or, in another suitable, inert and compatible solvent, is precooled to the polymerization temperature and added to the monomer-diluent admixture. The time necessary for effective reaction is not critical and will vary depending upon whether the reaction is carried out continuously or in bulk. The pressure employed in the present novel process is not critical and will generally be at or near atmospheric.

The products obtained by the use of the present novel modified catalyst are similar to the products obtained with conventional Friedel-Crafts or cationic catalysts. However, the products obtained in accordance with the present novel process are generally of a higher molecular weight than that obtained with the unmodified Friedel-Crafts type catalyst. Their utility is related to the type of alpha-monoolefin polymerized and to their molecular weight. Polyisobutylene, for example, ranges from a soft, tacky gum to an elastomeric solid. Further, copolymers such as isobutylene copolymerized with a diolefin such as isoprene, butadiene, cyclopentadiene, styrene, etc., will generally be rubbery in character and vulcanizable according to known methods in the art. The utility of the polymer products produced from the alpha-monoolefins to which the instant process relates are well-known in the art and need not be discussed in detail here.

Molecular weights of the polymers prepared in the subsequent examples were obtained from viscosity measurements of 0.1% polymer solutions in diisobutylene at 20° C. The intrinsic viscosities were obtained from single measurements using the known slope of the curve:

$$\ln \eta_{inh}/C$$

(inherent viscosity/concentration). The viscosity average molecular weights were calculated from the conventional equation:

$$\ln M_v = 12.48 + 1.565 \ln [\eta]$$

The cationic polymerization of isobutylene is affected by traces of impurities, especially moisture. Thus, the molecular weight of polyisobutylene can vary from day to day as a result of a change in atmospheric conditions. However, during any given day, such as an eight-hour working day, polymerization conditions remain relatively constant. Therefore, because of the difficulty in maintaining a constant moisture level in the polymerization apparatus, a "blank" run was made each day using the unmodified catalyst. In each of the ensuing examples the molecular weight of the polymers prepared with a modified catalyst is compared with the molecular weight of the "blank" prepared on the same day. As will later be shown, although the molecular weight of the "blank" may vary from day to day, the molecular weight of the polymer prepared with the modified catalyst is always significantly higher than the "blank" for that day.

The various aspects and modifications of the present novel process will be made more clearly apparent by reference to the following description and accompanying examples.

Example 1

Twenty-five ml. of isobutylene and 75 ml. of methyl chloride were each dried and freed from acidic impurities by passage through a barium oxide packed tower before being charged at —60° C. into a dried reaction flask. A catalyst solution was prepared by dissolving, at room temperature, 1 ml. of recrystallized ethyl aluminum dichloride in 25 ml. of purified methylene chloride protected by an inert atmosphere. 1.26 grams of dried, pulverized sodium bromide was then slurried at room temperature in the solution of ethyl aluminum dichloride in methylene chloride for 15 minutes.

One ml. of the clear supernatant liquid modified catalyst was then added to the flask containing the monomer and diluent. The temperature of the flask as well as of the modified catalyst was —60° C. After the modified catalyst was added, the temperature of the reaction medium rose and polymer was immediately formed. After about 10 minutes of stirring, the reaction mixture was poured into hot methanol in order to isolate the polymer product. The isolated polymer was dissolved in n-pentane, filtered and precipitated by pouring the solution into methanol. Fourteen grams of polymer having a viscosity average molecular weight of 164,000 were recovered.

A comparison run was made in exactly the same manner as described above with the same quantities and concentration of reagents except that the sodium bromide modification of the catalyst solution was omitted. This run yielded 14 grams of polymer having a viscosity average molecular weight of 76,000.

Example 2

The procedure of Example 1 was repeated except that 1.12 grams of dried, pulverized potassium bromide were utilized in place of the sodium bromide used in Example 1. Fourteen grams of polymer product having a viscosity average molecular weight of 535,000 were obtained. A comparison run made with the unmodified catalyst solution in exactly the same manner and with the same quantities and concentration of reagents yielded 14 grams of polymer having a viscosity average molecular weight of 76,000.

Example 3

In a similar manner to Example 1, a polymerization was carried out utilizing 0.99 gram of dried, pulverized sodium chloride in place of the sodium bromide of Example 1. 17.2 grams of polymer product having a viscosity average molecular weight of 666,000 were obtained. A comparison run made in the same manner except that the catalyst solution contained no sodium chloride. This run yielded 17 grams of polymer with a viscosity average molecular weight of 32,000.

Example 4

The procedure of Example 1 was repeated except that 0.75 gram of dried, pulverized potassium chloride was used in place of the sodium bromide of Example 1. 3.4 grams of polymer product having a viscosity average molecular weight of 666,000 were obtained. A comparison run with an unmodified catalyst solution yielded 17 grams of polymer with a viscosity average molecular weight of 32,000.

Example 5

The following listed complexes were prepared by heating the appropriate metal halide in the absence of any solvent with $AlEtCl_2$ or $AlEt_3$ in a 1:1 molar ratio of between about 120° C. and about 150° C. for between about 3 and about 5 hours until the metal halide completely dissolved in the $AlEtCl_2$ or $AlEt_3$. The liquid admixture was allowed to cool to room temperature, at which temperatuer the entire mixture solidified. The complexes prepared were: $KAlEtCl_3$, $NaAlEtCl_3$, $NH_4AlEtCl_3$, $NaAlEt_3CN$, $KAlEt_3Cl$, $KAlEt_2Cl_2$, $NaAlEt_3F$. Each of these complexes was used as a catalyst for the polymerization of isobutylene in a manner analogous to Example 1. Specifically, 25 ml. of isobutylene and 75 ml. of methyl chloride were dried and purified in a similar manner to taht described in Example 1 for each run. Portions of each of the aforementioned complexes were heated until they reached a liquid state and then between about 0.5 and about 1.0 ml. of each of the aforementioned complexes were suspended in 25 ml. of methyl chloride and then added to the monomer-diluent admixtures as hereabove recited. Polymerization temperatures ranged from —50° C. to —70° C. In no case was any polymer obtained.

Example 5, therefore, shows that the use of a complex, prepared from the catalysts and metal halides utilized in the present novel process, does not result in the formation of any polymer product. In contrast, Examples 1 through 4 illustrate that the use of a combination of the same catalyst and metal halide, but contacted under non-complexing conditions, not only yields polymer product but increases the molecular weight over that obtained by the use of the unmodified catalyst.

Example 6

The procedure of Example 1 was repeated except that 0.52 gram of dried, pulverized lithium chloride was used in place of the sodium bromide of Example 1. 6.1 grams of polymer product having a viscosity average molecular weight of 105,000 were obtained. A comparison run made in exactly the same manner but without modification of the catalyst with lithium chloride yielded 12.1 grams of polymer product having a viscosity average molecular weight of 27,000.

Example 7

Twenty-five ml. of isobutylene and 75 ml. of methyl chloride were purified and condensed separately into a flask immersed in a bath cooled to −98° C. A catalyst solution was prepared by saturating 25 ml. of methylene chloride was thereafter added until a large excess of un- Undissolved aluminum chloride was removed and lithium chloride was theerafter added until a large excess of undissolved lithium chloride was present. One ml. of the supernatant solution was thereafter added at −98° C. to the aforementioned isobutylene-methyl chloride admixture. 0.10 gram of polymer product having a viscosity average molecular weight of 507,000 was obtained.

A comparison run made in exactly the same manner but without modifying the aluminum chloride catalyst with lithium chloride yielded 0.42 gram of polymer having a viscosity average molecular weight of 276,000.

Example 8

An excess of dried lithium chloride is added to a clear solution of dried methylene chloride saturated with aluminum chloride at room temperature. One ml. of the supernatant liquid is added to a solution of 25 ml. of α-methylstyrene (containing no more than 10 p.p.m. of water) in 75 ml. of dried methylene chloride at −50° C. After stirring for one hour, the reaction mixture is precipitated into methanol. The dried polymer weighs about 10 grams and is calculated to have a number average molecular weight of about 8,500.

A comparison run is made in the same manner as described above with the same quantities and concentration of reagents, except that the lithium chloride modification is omitted. This run yields about 11 grams of polymer having a number average molecular weight of about 4,500.

Example 9

A catalyst solution is prepared by the addition at room temperature of excess dried lithium chloride to methyl chloride (dried by passage through barium oxide powder) which has been saturated with aluminum chloride at the boiling point of methyl chloride. Aliquots of the supernatant liquid from the catalyst solution are added to a solution of 97 ml. of dried isobutylene and 3 ml. of dried isoprene in 200 ml. of methyl chloride, at −85° C., until polymerization is completed. The polymer is recovered, reprecipitated and dried. The polymer has a viscosity average molecular weight of about 780,000 and a mole percent unsaturation of about 1.8.

The above polymerization, when repeated, but without the use of lithium chloride, gives a polymer product with the same mole percent unsaturation as above stated but with a viscosity average molecular weight of about 425,000.

While there are above described a number of specific embodiments of the present invention, it is obviously possible to employ other embodiments and various equivalent modifications and variations thereof without departing from the spirit of the invention.

Having set forth the general nature and specific embodiments of the present invention, the true scope is now particularly pointed out in the appended claims.

What is claimed is:

1. A process for preparing a modified Friedel-Crafts type catalyst which comprises (a) admixing a compound having the empirical formula $R_nAlX_m$, wherein R is a $C_1$–$C_{12}$ alkyl, X is halogen, n is a cardinal number of from 0 to 2, m is a cardinal number of from 1 to 3, and n plus m equals 3, with a halide of a cationic material selected from the group consisting of lithium, sodium, potassium and ammonium at a temperature of between about 0° C. and about 100° C., (b) separating the solid phase from the liquid phase, and (c) recovering, as a modified Friedel-Crafts catalyst, the liquid phase of the uncomplexed admixture at a temperature of between about 0° C. and about 50° C.

2. A process according to claim 1 wherein the compound having the empirical formula $R_nAlX_m$ is ethyl aluminum dichloride.

3. A process according to claim 1 wherein the admixing and recovery temperature is room temperature.

4. A process according to claim 3 wherein the cationically initiable monomer is an alpha-monoolefin.

5. A process according to claim 4 wherein the cationically initiable alpha-monoolefin is isobutylene.

6. A process according to claim 4 wherein between about 85 and about 99.5 wt. percent of isobutylene and between about 15 and about 0.5 wt. percent of isoprene is polymerized.

7. A process according to claim 4 wherein the compound having the empirical formula, $R_nAlX_m$, is ethylaluminum dichloride.

8. A process according to claim 4 wherein the mole ratio of the inorganic metal halide to the compound having the empirical formula, $R_nAlX_m$, is between about 0.1:1 and about 10:1.

9. A process for preparing a modified Friedel-Crafts type catalyst which consists essentially of dissolving in an inert alkyl halide solvent a compound having the empirical formula, $R_nAlX_m$, wherein R is a $C_1$–$C_{12}$ alkyl, X is halogen, n is a cardinal number from 0 to 2, m is a cardinal number from 1 to 3, and n plus m equals 3, and admixing with this catalyst solution a halide of a cationic material selected from the group consisting of lithium, sodium, potassium and ammonium at a temperature of between 0° C. and about 100° C., removing the solid phase, and recovering as the modified Friedel-Crafts catalyst the liquid phase of the uncomplexed admixture at a temperature of between 0° C. and about 50° C.

10. The process of claim 5 wherein the solvent is carbon disulfide.

11. The process of claim 5 wherein the solvent is methylene chloride and the compound is aluminum chloride.

12. The process of claim 5 wherein the compound is ethyl aluminum dichloride, the solvent is methylene chloride and the metal halide is sodium bromide.

13. A process for polymerizing a cationically initiable monomer having the empirical formula $CH_2=CR_1R_2$, wherein $R_1$ is selected from the group consisting of hydrogen, $C_1$–$C_3$ alkyl, phenyl, and $C_1$–$C_3$ alkoxy and $R_2$ is selected from the group consisting of $C_1$–$C_{10}$ alkyl, halogen-substituted $C_1$–$C_{10}$ alkyls, $C_1$–$C_3$ alkoxy and aryl, which comprises polymerizing said monomer at a temperature of about 0° C. to about −120° C. with about 0.1 to about 6.0 wt. percent of a modified Friedel-Crafts catalyst prepared by (a) admixing a compound having the empirical formula $R_nAlX_m$, wherein R is a $C_1$–$C_{12}$ alkyl, X is halogen, n is a cardinal number from 0 to 2, m is a cardinal number from 1 to 3 and n plus m equals 3, with a halide of a cationic material selected from the group consisting of lithium, sodium, potassium and ammonium at a temperature of about 0° C. to about 100° C.; (b) separating the solid phase so formed from the liquid phase; and (c) recovering as the modified Friedel-Crafts catalyst, the liquid phase of the uncomplexed admixture at a temperature between 0° C. to 50° C.

14. A modified Friedel-Crafts catalyst which is substantially liquid at about 0° C. to about 50° C. and which comprises the uncomplexed admixture of a compound having the general formula $R_nAlX_m$ wherein R is a $C_1$–$C_{12}$ alkyl, X is halogen, n is a cardinal number from 0 to 2, m is a cardinal number from 1 to 3 and n plus m equals 3 and a halide of a cationic material selected from the group consisting of lithium, sodium, potassium and ammonium.

15. The catalyst of claim 14 wherein said compound is ethyl aluminum dichloride.

References Cited

UNITED STATES PATENTS 3,215,638  11/1965  Dunn _____ 260—442
3,281,490  10/1966  Goble et al. _____ 260—442

(Other references on following page)

| | | | |
|---|---|---|---|
| 3,328,372 | 6/1967 | Thomas et al. | 260—429 |
| 3,331,786 | 7/1967 | Bleuenstein | 260—429 |
| 3,352,839 | 11/1967 | Lehr | 260—429 |
| 2,481,273 | 9/1949 | Young | 260—85.3 |
| 2,220,930 | 11/1940 | Kraus | 260—94.8 |
| 2,085,535 | 6/1937 | Langedijk | 260—94.9 |

JOSEPH L. SCHOFER, Primary Examiner

R. A. GAITHER, Assistant Examiner

U.S. Cl. X.R.

252—429, 438, 442; 260—82.1, 88.2, 91.1, 91.7, 93.5, 93.7 94.8, 94.9